Figure 5:
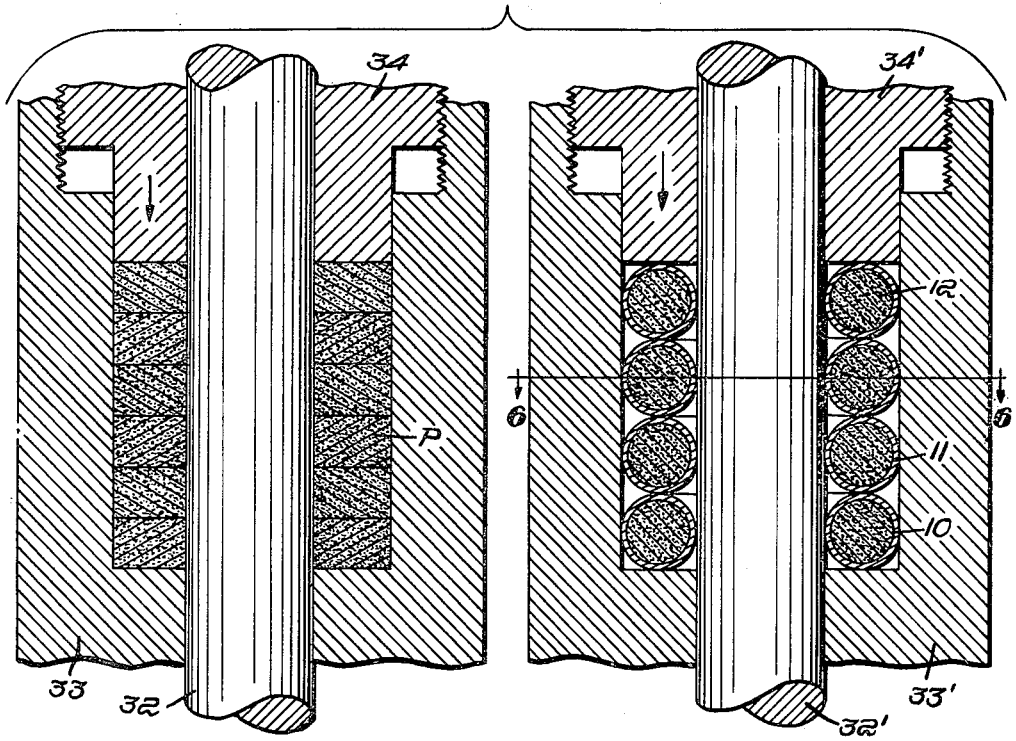

April 3, 1945. J. J. FIECHTER 2,372,773
PACKING
Filed Feb. 9, 1943 2 Sheets-Sheet 1
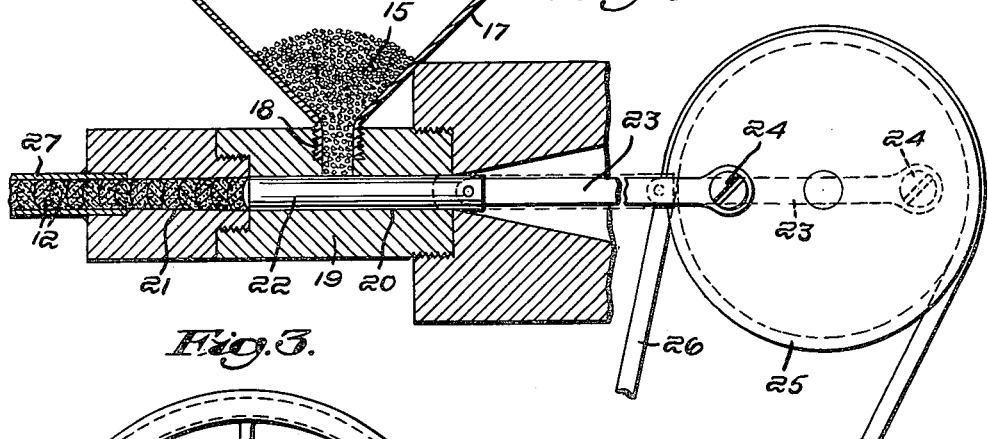
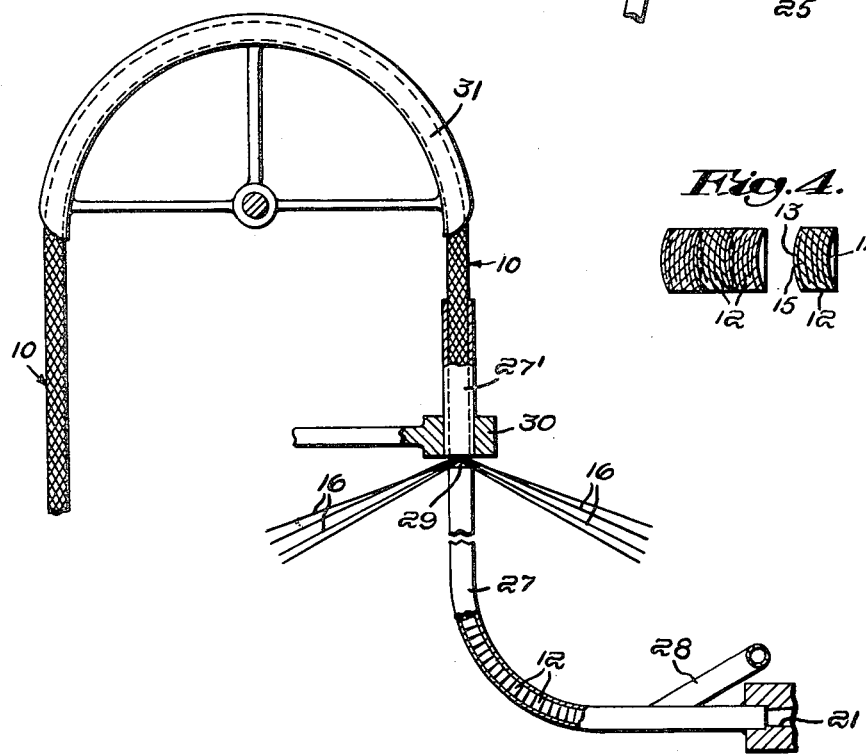
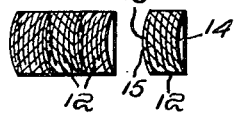
Inventor:
John J. Fiechter,
by Spear, Rawlings & Spear.
Attorneys April 3, 1945.  J. J. FIECHTER  2,372,773

PACKING

Filed Feb. 9, 1943  2 Sheets-Sheet 2

Inventor:
John J. Fiechter,
By Spear, Rawlings & Spear
Attorneys

UNITED STATES PATENT OFFICE 2,372,773

PACKING

John J. Fiechter, Willow Grove, Pa.

Application February 9, 1943, Serial No. 475,291

5 Claims. (Cl. 288—8)

This invention relates to self-lubricating semi-metallic packing and method of producing the same, and is an improvement upon the packing disclosed in my co-pending application for patent Serial No. 288,978, filed August 8, 1939, now Patent No. 2,316,778, issued April 20, 1943.

The packing of my aforesaid application consisted of flakes of soft metal, such as lead, coated with particles of lubricating material, such as graphite, and was characterized in that the metal flakes were completely encased within and protected against destructive heat by the lubricant.

In producing such packing, I first coated the metal flakes with a carbonizable binder and then mechanically mixed the lubricant with the binder-coated flakes. The mixture was then baked at a temperature and for a time sufficient to carbonize the binder but insufficient to destroy the identity of the metal flakes as flakes. Hence the metal flakes maintained their individuality as flakes whether the packing was used in loose form or was molded into rings or other shapes.

Moreover, because each metal flake was completely encased by a film of lubricating material which was permanently bonded thereto by the thin carbonized binding film furnished by the carbonized binders, the resistance of the metal flakes to destruction by heat when the packing was put in service was materially increased. For example, where the metal flakes were of lead, and had a normal melting point of lead, the heat-resisting effect of the encasing film of lubricant elevated the melting point between 200% and 300%.

My present invention utilizes this basic packing material, but also involves fabricating it into a new form, viz., into an extremely flexible elongated body characterized in that it is self-sustaining as to form but is flexible when bent in any direction and at substantially any point along its major axis.

According to my present invention, such body is continuously extruded by subjecting predetermined charges of the lubricant-coated flakes to repeated blows in an axial direction while retarding the movement of the mass in said direction. This has the double effect of continuously rough-shaping the mass into a plurality of pellets which have complemental ball and socket establishing surfaces on their adjacent ends and of interlocking said pellets to each other at their ball and socket joints to form a continuous body.

The ball and socket joints render the extruded body flexible when bent relative to its major axis, so that it can readily accommodate itself to and furnish maximum lubrication for the shaft, rod or other object to which it is applied without "blowing" through the stuffing box and without leaving unlubricated areas along the shaft as is the case where the packing is in a plastic or amorphous state.

In producing my packing, I continuously feed predetermined charges of my lubricant-encased soft metal into a die having a tapered extrusion nozzle through which the mass is forced by the repeated blows of a plunger. The extrusion nozzle both confines the mass to give the extruded body its final shape and retards its feed under the repeated blows of the plunger. Thus the pellets are successively rough-shaped and joined to each other at their complemental ball and socket portions.

The extruded body may be of cylindrical, square, or other cross-section depending upon the cross-section of the bore of the extrusion nozzle. The several pellets are of substantially uniform size and shape and are characterized in that the trend of the several flakes composing each pellet is across the major axis of the pellet so as to cause a natural expansion of the packing as a whole against the shaft or rod when the packing is laid therearound.

Where, as here shown, the bore of the extrusion nozzle is a tapered cylinder, the pellets are disc-like in shape and have convex leading ends and concave trailing ends which interfit to form the multiplicity of ball and socket joints throughout the length of the extruded body.

Desirably the extruded body is wrapped in any suitable lubricant-permeable covering. This may take the form of a braided covering of rayon, cotton or other suitable fibre, and such covering may be applied in any suitable manner, as by means of a conventional braider, to the extruded body after it emerges from the extrusion nozzle.

Among the advantages of my packing are the following: It is inexpensive to produce and extremely resistant to heat, wear and pressure in service. It lubricates all surfaces of the shaft or rod in a uniform and efficient manner. The ball and socket joints give it unusual flexibility at many points and enable it to be bent in any direction about its major axis. The individual pellets have the capacity, to a limited extent, of sliding on each other when compressed, thereby ensuring adequate lubrication of all surfaces of the shaft or rod. They also tend to open at their joints when the packing is bent around the shaft or rod, thus enabling the packing to "breathe." And where the pellets are disc-like in shape, they touch the shaft or rod at only one point in their circumference, and hence exert less friction on the shaft.

On breaking down my packing for purposes of examination, it will be found that each pellet can be detached in its entirety and itself broken down into its component flakes of lubricant-coated soft metal.

Thus, in my final product, the pellets maintain their identity as pellets, and the flakes comprising said pellets maintain their identity as flakes. This is in sharp contrast to the plastic or amorphous packings of the prior art which disintegrate and blow through the stuffing box when subjected to any considerable degree of heat or pressure.

In the accompanying drawings wherein I have shown a preferred form of my packing and illustrated diagrammatically a preferred method of producing the same, Fig. 1 is a fragmentary elevation, partly in section, of my extruded and extremely flexible packing.

Figs. 2 and 3 diagrammatically illustrate successive steps in my preferred method of producing my packing.

Fig. 4 is an enlarged broken section through my packing, particularly illustrating the flexible nature thereof, due to the circumstance that my packing is in the form of an extruded and axially compacted body composed of a plurality of interlocked pellets, preferably disc-like in shape and concavo-convex in cross section, which form a multiplicity of ball and socket joints throughout the length of the body.

Figure 6:
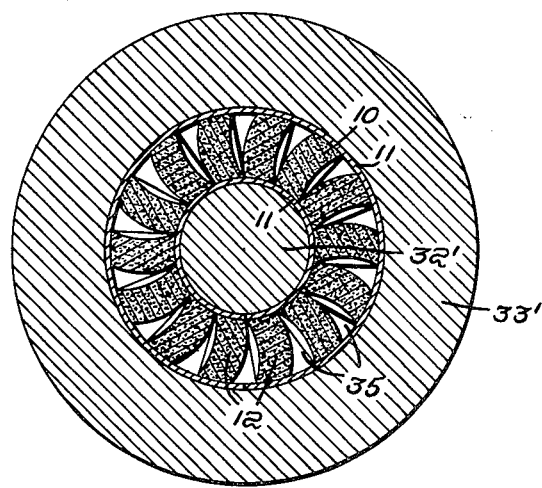

Fig. 5 is a vertical section through conventional stuffing boxes, the box at the left of said figure being packed with conventional packing and that at the right being packed with my new packing, and Fig. 6 is a cross-section on the line 6—6 of Fig. 5, taken through the stuffing box shown at the right in said figure.

My packing comprises an elongated flexible extruded body indicated generally at 10 and a lubricant-permeable covering 11 (see Fig. 1).

The body 10 is composed of a plurality of axially compacted and interlocked pellets 12. As a result of their axial compaction, the adjacent faces 13 and 14 of the extruded pellets are shaped (see Fig. 4) to establish complemental ball and socket joints at a multiplicity of zones throughout the length of the body.

Preferably, but not necessarily, the pellets are composed of the packing material disclosed in my aforesaid application. When so composed, each pellet consists of a number of flakes 15 of lubricant-coated soft metal, such as lead. Each metal flake is encased within a film of lubricant, such as graphite, which is permanently bonded thereon by a thin carbonized binding film, such as foundry molasses.

My extruded body 10 may have any desired cross-section, as cylindrical, square, etc., and is here shown as cylindrical, in which case the individual pellets 12 are disc-like in shape. The leading end 13 of each pellet is convex and its trailing end 14 is concave to thereby establish the several ball and socket joints which join the several pellets together as a flexible body.

The covering 11 for the body may be of any suitable material which is permeable to the lubricant, and is here shown as being composed of a plurality of braided fibrous strands 16, such as rayon, cotton or the like.

In producing my packing, I prefer to proceed as follows:—I place in a hopper 17 a mass of the lubricant-coated soft metal flakes 15. Beneath the restricted discharge end 18 of the hopper I arrange a die block 19 having an axial bore 20 disposed at right angles to the discharge 18. The bore 20 is tapered at its forward end as indicated at 21 to exert a retarding action on the passage of the material 15 therethrough and thus function as an extrusion nozzle.

Reciprocating within the outer end of bore 20 is a plunger 22 operated in any suitable manner as by eccentric rod 23, pinned at 24 to pulley 25 which is driven at a rapid rate by belt 26 from any suitable power source (not shown).

Preferably the plunger stroke is approximately 1½" and the plunger is reciprocated approximately 800 times a minute. Preferably the tapered portion 21 of the bore is about ½".

In order to expedite the passage of the material along the guide tube 27 leading from the extrusion nozzle to the braider, I prefer to externally lubricate the extruded body. This may be conveniently done by means of a lubricant conduit 28 opening into the guide tube beyond the extrusion nozzle and by means of which lubricant under pressure is fed from any suitable source of supply (not shown).

Between the terminal 29 of the guide tube 27 and the supporting bracket 30 for a second guide tube 27' the fibrous strands 16 of covering material are braided around the extruded body 10 as said body is continuously fed therepast.

From the braider, the covered body is passed over an overhead guide 31 by which it is directed to any suitable collection receptacle (not shown).

Referring to Figs. 5 and 6, wherein I have attempted to illustrate comparatively the action of my packing and conventional packing, I have designated at 32 and 32' shafts or rods to be packed, at 33 and 33' stuffing boxes, and at 34 and 34' packing glands.

The shaft 32 at the left of Fig. 5 is packed with conventional packing P. The shaft 32' at the right of Fig. 5 is packed with my new packing 10.

As best appears in Fig. 6 my packing opens up as indicated at 35 at the ball and socket joints connecting the pellets to permit the packing to "breathe." The pellets contact the shaft only at their peripheral edges, and have a sliding action on one another when the packing gland 34' is tightened. This insures adequate lubrication of the shaft at all areas with the minimum friction.

The hopper 17 may be equipped with any suitable feeding device (not shown) for successively placing predetermined charges of material 15 into the bore 20 of the extrusion nozzle, and with any suitable agitator (not shown) keep the material 15 in suitable condition to be fed.

From the foregoing, it will be seen that by subjecting each charge of material 15 to the repeated blows of the plunger 23, and while simultaneously retarding the movement of the mass in the direction of such blows by means of the restricted portion 21 of the bore, the pellets are successively rough-shaped and interlocked with each other at their complemental ball and socket-establishing surfaces as the mass is continuously forced along the bore and up through the guide tube 27.

While I have described a preferred embodiment of my packing and its method of production, I recognize that both the article and the method of making it may be varied in minor respects. Accordingly, all such changes are to be regarded as within the spirit and scope of my invention if within the limits of the appended claims.

What I therefore claim and desire to secure by Letters Patent is:

1. A self-lubricating semi-metallic packing, comprising an extruded elongated body composed of a plurality of interlocked pellets of lubricant-coated soft metal, said pellets being axially compacted and formed with complemental interfitting ball and socket portions which render said body flexible when bent relative to its major axis, and means to hold said pellets in assembled relation.

2. The packing of claim 1 wherein said means for holding the pellets in assembled relation comprises a lubricant-permeable covering in the form of strands of fibrous material braided about said body.

3. The packing of claim 1, the pellets being concavo convex in cross-section.

4. The packing of claim 1, the pellets consisting of flakes of soft metal encased in a film of lubricating material bonded to the flakes by a thin carbonized binding film.

5. A packing pellet consisting of a compacted body of lubricant-coated particles of soft metal, the ends of said body being defined by complementary concave and convex surfaces so that the same may interfit with like bodies when assembled about a member to be sealed.

JOHN J. FIECHTER.